Nov. 2, 1926.
J. C. SEIM
1,605,787
TIE TONGS
Filed May 24, 1926
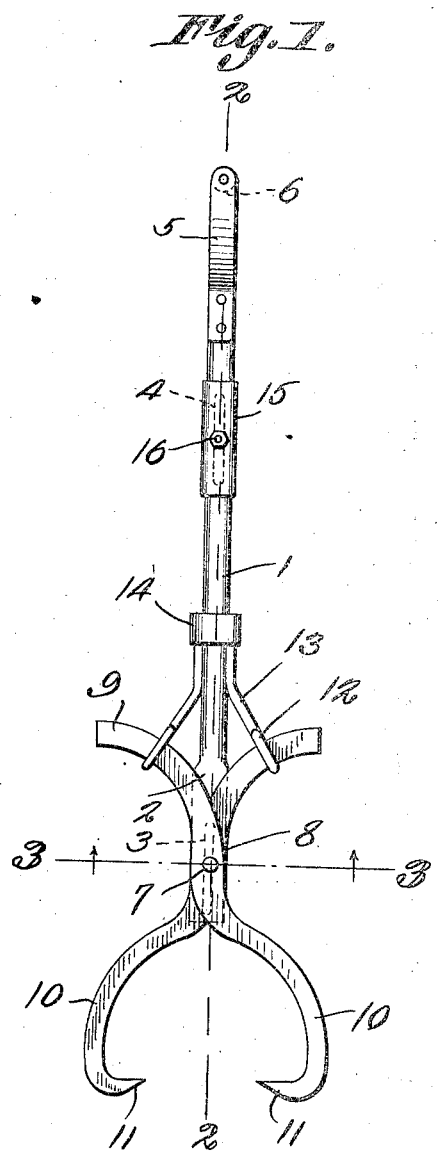
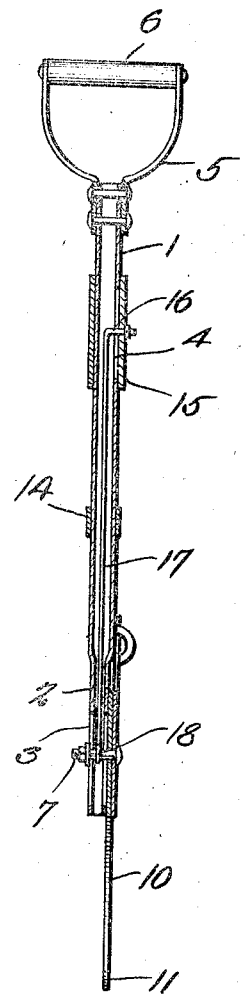
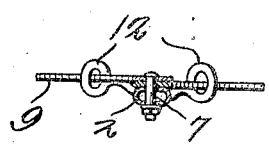
John C. Seim
Inventor
By C. A. Snow & Co.
Attorneys Patented Nov. 2, 1926.

1,605,787

UNITED STATES PATENT OFFICE.

JOHN CASPER SEIM, OF WALNUT, KANSAS.

TIE TONGS.

Application filed May 24, 1926. Serial No. 111,330.

This invention relates to tongs designed primarily for use in shifting railway ties, it being so constructed that one person can place the same in engagement with the tie and, by pulling on the handle, lift or drag the tie to a desired position.

A further object is to provide a tongs so constructed that the jaws thereof will grip the tie with increasing force in proportion to the power exerted in lifting or dragging the tie, thereby eliminating all danger of the tongs becoming detached from the tie.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a front elevation of the tongs.

Figure 2 is a section on line 2—2, Figure 1, the handle being shown in elevation.

Figure 3 is a section on line 3—3, Figure 1.

Referring to the figures by characters of reference 1 designates the tubular shank of the tongs, the same being preferably formed of pipe having one end portion flat as at 2 and provided with opposed longitudinal slots 3. Another slot 4 is formed in the shank near the upper end and secured to said end of the shank are opposed members 5 of a yoke between which is fastened the grip 6 of a handle.

A pin 7 is extended transversely through the flat portion 2 of the shank and is adapted to slide within the slots 3. Pivotally mounted on one end portion of this pin are levers 8 each of which has an outwardly curved arm 9 at one end and an outwardly curved jaw 10 at its other end. At the end of the jaw there is provided an inwardly extended prong 11, the prongs on the two jaws being extended toward each other as shown in Figure 1. Arm 9 and jaw 10 of each lever are extended beyond opposite sides respectively of the shank 1 and the two arms 9 are mounted within eyes 12 provided at the lower ends of strips 13. These strips are extended from a collar 14 secured to the shank 1. A sleeve 15 is slidably mounted on the shank and is secured to the outturned end 16 of a rod 17 extending longitudinally within the shank. One end of this rod is attached to the pin 7 as shown at 18.

In practice the sleeve 15 is slid toward the handle 6 and will cause the rod 17 to pull on the pivot pin 7. Thus the levers 8 will be moved toward the handle and the curved arms 9 will slide in the guide eyes 12 so as to cause the jaws 10 to swing apart. Said jaws are then placed astride the tie to be moved after which sleeve 15 is released and the handle 6 is pulled away from the tie. This will result in movement of the shank 1 relative to pin 7 with the result that the guide eyes 12 will travel along the curved arms 9 and swing them toward each other, causing the jaws 10 likewise to move toward each other and to force the prongs 11 into opposed faces of the engaged tie. Obviously, therefore, the harder the tongs are pulled the more firmly they will grip the tie. The tie can therefore be readily lifted or pulled from place to place without danger of becoming disconnected from the tongs. After the tie has been properly positioned the tongs can be readily disengaged therefrom simply by pulling the sleeve 15 upwardly on the shank 1 or by holding sleeve 15 and thrusting the shank 1 downwardly relative thereto. This relative movement of the shank 1 and sleeve 15 will result in the arms 9 shifting upwardly or the guide eyes 12 moving downwardly so that the jaws 10 will be swung apart and the tie disengaged.

While this tool is designed primarily for shifting railway ties it is to be understood that the same can be employed to advantage wherever it is desired to lift or to move a timber.

What is claimed is:

1. Tongs of the class described including a shank having a handle at one end, crossed levers pivotally and slidably connected to the other end portion of the shank, each of said levers having an outcurved arm at one end and an outcurved jaw at its other end, the arm and jaw being extended in opposite directions respectively from the shank, guides for the respective arms fixed relative to the shank, and means for shifting the pivot of the lever to move the arms within the guides and open or close the jaws.

2. A device of the class described including a shank having a handle at one end, crossed levers pivotally and slidably connected to the other end portion of the shank, guides upon the shank, said levers having oppositely extending curved arms at one end mounted within the respective guides and oppositely extended jaws at the other end, the jaw and arm of each lever being extended in opposite directions respectively, means slidable on the shank and connected to the pivot of the levers for shifting said levers longitudinally of the shank and relative to the guides to open or close the jaws, and means extending from the jaws for biting into and engaging an object therebetween.

3. A device of the class described including a shank having a handle at one end, crossed levers pivotally and slidably connected to the other end portion of the shank, guides upon the shank, said levers having oppositely extending curved arms at one end mounted within the respective guides and oppositely extended jaws at the other end, the jaw and arm of each lever being extended in opposite directions respectively, means slidable on the shank and connected to the pivot of the levers for shifting said levers longitudinally of the shank and relative to the guides to open or close the jaws said means including a sleeve slidably upon the shank, and a rod connection within the shank between the sleeve and the pivot of the levers.

In testimony that I claim the foregoing as my own, I have hereto affixed my signature.

JOHN C. SEIM.